May 17, 1966  E. J. TOSCANO  3,252,147
ELECTRICAL SYSTEM OF CONTROL
Filed April 2, 1962  7 Sheets-Sheet 1

INVENTOR
ESTEBAN J. TOSCANO,
BY
AGENT.

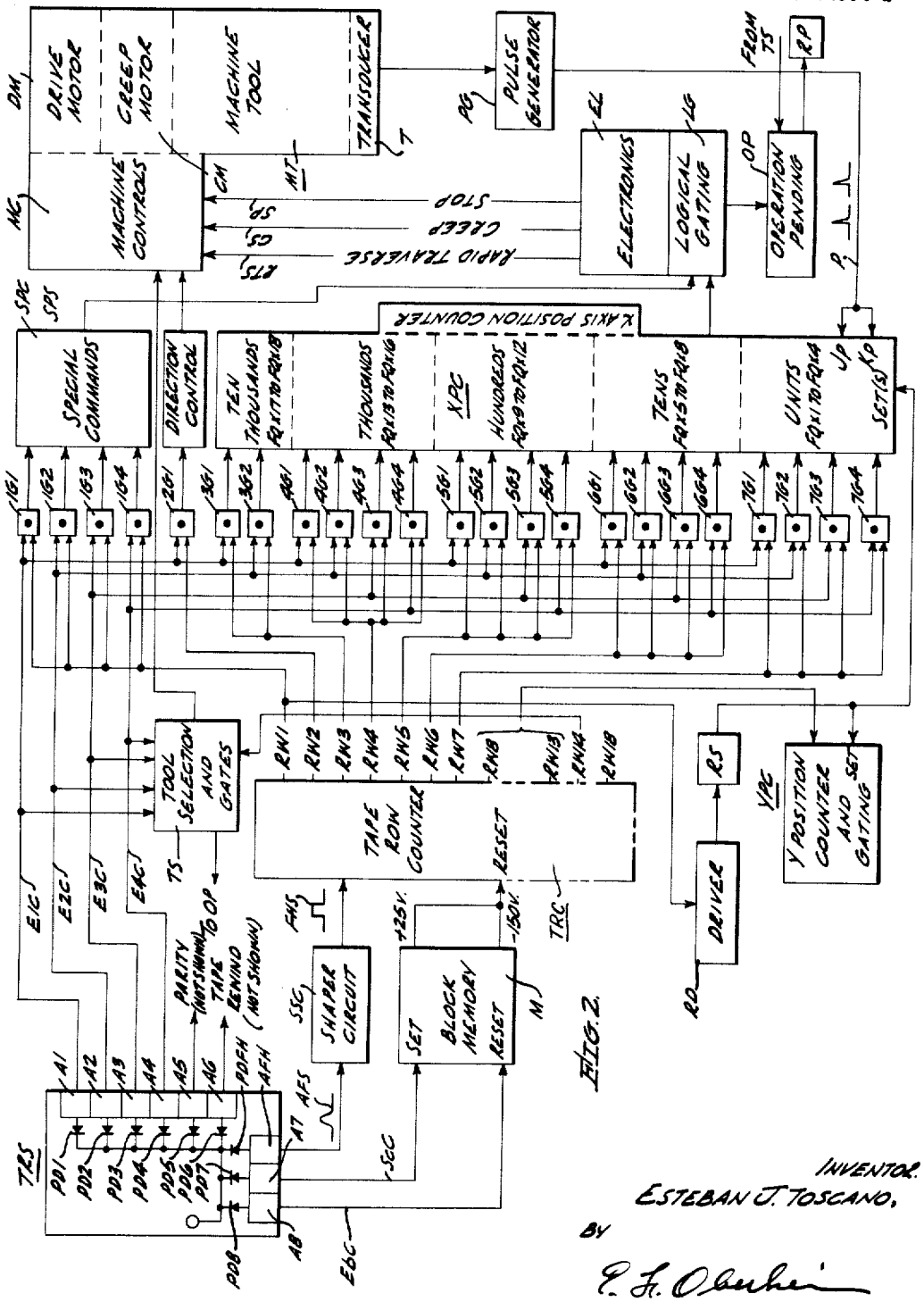

May 17, 1966  E. J. TOSCANO  3,252,147
ELECTRICAL SYSTEM OF CONTROL
Filed April 2, 1962  7 Sheets-Sheet 3

INVENTOR.
ESTEBAN J. TOSCANO,
BY
E. F. Oberheim
AGENT.

2

United States Patent Office 3,252,147
Patented May 17, 1966

3,252,147
ELECTRICAL SYSTEM OF CONTROL
Esteban J. Toscano, Los Angeles, Calif., assignor to Hughes Aircraft Company, Culver City, Calif., a corporation of Delaware
Filed Apr. 2, 1962, Ser. No. 184,204
14 Claims. (Cl. 340—172.5)

This invention relates generally to electrical control systems and more particularly to numerically programmed systems for controlling power operated devices.

In this connection illustrative reference is made to selecting or positioning systems such as found in machine tool controls for instance wherein tool spindles or tools are selected according to predetermined electrical codes, or movable platens or tables are positioned in one axis or in several axes according to such codes.

Numerical codes are usually of binary character and may be arranged for either parallel or serial presentation by means of suitable transducers arranged to scan the record medium on which the code information is recorded.

This invention is concerned with serial or serial-parallel information code systems.

Several types of mediums are available for recording of serial information codes including magnetic drums, magnetic tapes and perforated tapes. With magnetic tapes and drums magnetic heads are employed for the purpose of writing and reading. The signals which are produced by the heads are usually amplified and shaped to provide control signals applicable in controlling various types of electronic devices, such as flip flops and relays. Perforated tapes may be read by mechanical types of tape readers which control switches. These are usually incrementally driven so that the holes may be read whenever the tape is stopped and the tape controlled switches set in correspondence with the tape hole pattern. The use of an opaque perforated tape permits transducing by means of photosensitive devices, such as photoresistors or photodiodes. This latter arrangement is presently preferred because it is suitable for industrial environments, is relatively maintenance free, provides high operating speeds for the intended purpose and is relatively economical.

The presentation of information by some suitable information code transducer such as a photoelectric tape reader, as described, in either serial or serial-parallel form usually requires some type of a distributor for distributing the information which is read row by row from the tape to selected points in the system. Usually these selected points each include an appropriate number of storage elements to store the bit or bits of information which are read from each row.

In the past, depending upon the number of bits in a particular row, a single level or multilevel stepping switch has been employed to transmit each row of discrete signals to the selected storage devices. Such switches, however, have been trouble prone. One of the problems has been associated with unreliable contact operation, especially at low signal levels. Such problems can result from dirty contacts or from contact bounce, or both. Such switch arrangements require frequent maintenance, have a relatively short life and necessarily require low speed operation to avoid electrical or mechanical failures in operation.

Accordingly, one object of this invention is to provide an electrical system of control including a signal distributor which is capable of high speed operation and is relatively trouble free.

A more specific object of this invention is to provide a discrete single programmed electrical system of control utilizing an electronic type of distributor for distributing the discrete signals representing the program in the system.

The aforesaid and other objects and advantages are accomplished in a numerically programmed type of control system in the provision of an electronic counter which is utilized to generate signals indicative of respective rows of information on a record medium, such as a perforated tape. Such a tape may include a plurality of columns sufficient in number at least to provide discrete bit positions in the respective rows to represent particular values of numbers. Such an arrangement may be formulated on the basis of the binary coded decimal system wherein the respective bit positions in columns 1, 2, 3 and 4 on the tape, for example, might be weighted 1, 2, 4 and 8. Selected rows may represent different number groups in the decimal coded system, such as tens of thousands, thousands, hundreds, tens and units. Any suitable type of transducer system may be utilized to detect the presence, or absence, of a perforation (the presence of a perforation in this instance representing the presence of an information bit).

For convenience of description reference will be made to the photoelectric type of tape reader including a suitable light source on one side of the tape providing discrete tape illumination in each column and respective photoresistive devices or photodiodes positioned in side by side relationship across the tape in laterally displaced positions to intercept light coming through perforations in the tape in the respective columns. Some tape readers drive the tape past the sensing elements by means of a powered sprocket having teeth engaging a column of feed or sprocket holes in the tape. Normally, but not necessarily, these sprockets holes are aligned with the information rows on the tape. The sprocket holes provide a means for counting the rows in the tape as the latter moves past the sensing elements. In tape readers that do not make use of a powered sprocket to drive the tape but use a different system of tape driving, the sprocket holes may be transduced by a suitable photosensitive transducer system to produce an electrical timing signal or feed hole signal with each sprocket hole.

A counter which may be called a timing signal counter or a tape row counter is employed to count the sprocket holes and, hence, the rows of information on the tape. The number of information rows required to provide the desired control for a particular equipment depends upon the complexity of the control which is to be provided. In any event, this is predetermined and a counter is utilized having sufficient capacity to count the total number of rows for a particular operation.

The type of counter which may be used will depend on the particular application and may be of the form of a binary counter, a ring counter or a combination of ring counters, or a combination of ring and binary counters. All such counters will require gating to identify the particular output. The complexity of the gating will depend largely upon the character of the counter which is employed. For most applications a combination of ring counters requires gating of less complexity than the other counters which have been named.

Any suitable type of bistable storage device may be used in such a counter. Such devices include vacuum or gas filled electronic tubes, transistors, binistors or magnetic core devices. Special forms of vacuum or gas filled tubes, such as decade counter tubes, may be employed for such an arrangement. Such a counter may be unidirectional in character and is necessarily provided with a reset facility.

The counting of rows of holes on the tape is effected within groups of rows which are called blocks. The ordinal position of a row within a particular block is what determines the significance of the contents of that row. In application, suitable markers are provided in selected columns on the tape to indicate the beginning of a block of information which is to be read and the end of such a block of information. These may be identified as the start code signal and the end-of-block signal, respectively, and are utilized herein together with signals generated by the feed or sprocket hole in the tape to provide a suitable control of the counter. The end-of-block signal resets and inhibits the counter; the start code signal removes the resetting and inhibiting signal, and the feed hole or sprocket signals drive the counter in the absence of the reset and inhibiting signal.

The output of the counter is utilized in conjunction with selected information signals from the tape to control gating circuits which in turn are utilized to control selected elements of the control system. If such an arrangement is employed in a machine tool control, provision may be made for generating and gating information to tool or spindle selection circuits, to direction control circuits to control the direction of movement of a machine table or spindle along its axis, or to suitable positioning circuits including, additionally, a position counter controlled by the electronic distributor herein for providing a configuration of electrical signals indicative of a desired position which may be utilized to move a machine table or a tool spindle to a desired position along a particular axis. In this latter mode of operation a suitable transducer system controlled by the machine tool is employed to produce discrete count pulses, each representative of a predetermined increment of displacement of a manchine element, for application to the position counter. At a predetermined minimum residual count of the position counter, including zero, movement of the machine element is stopped.

Other objects and advantages will become apparent from a study of the following specification when considered in conjunction with accompanying drawings in which:

FIG. 2 is a block diagram of an improved electrical control system incorporating the principles of this invention;

Figure 7:
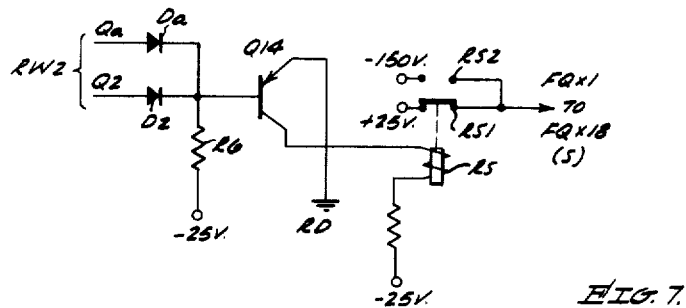
Figure 8:
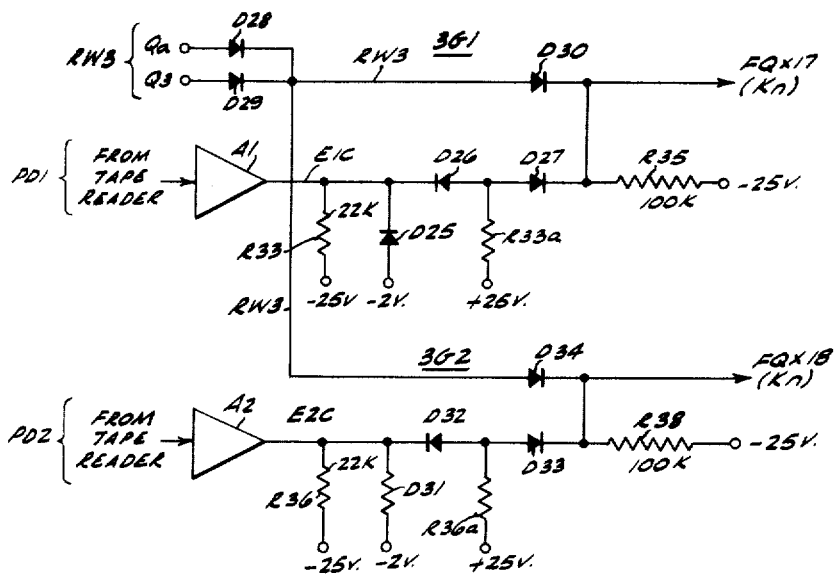
Figure 9:
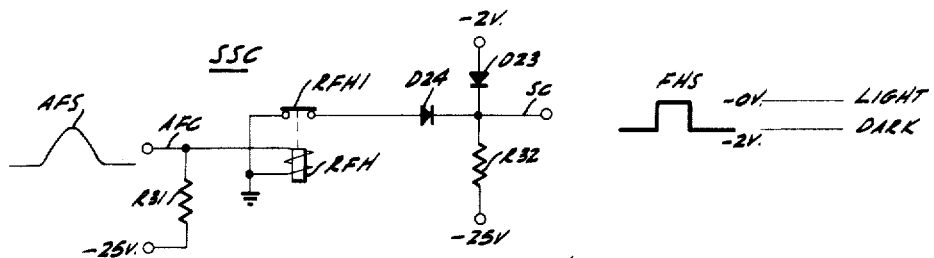
Figure 10:
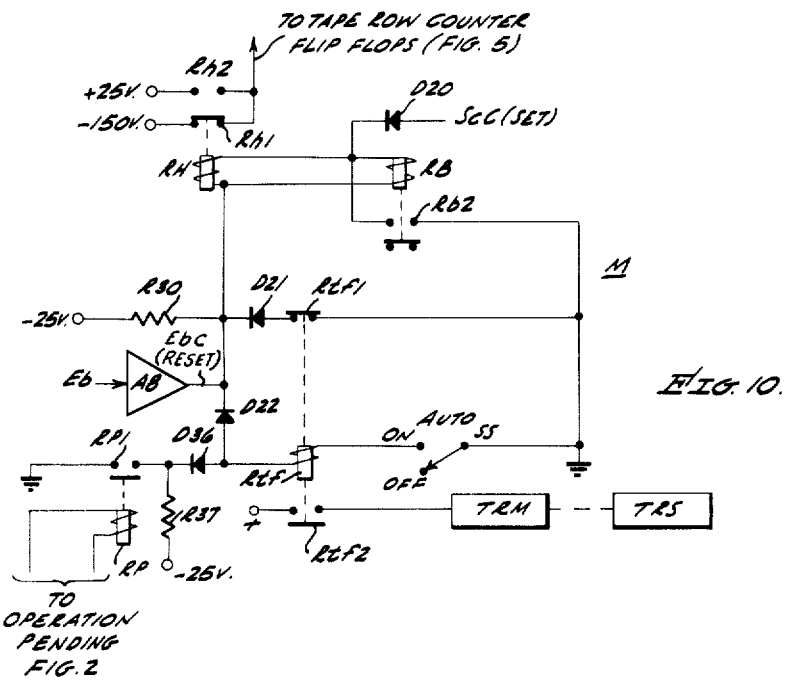
Figure 11:
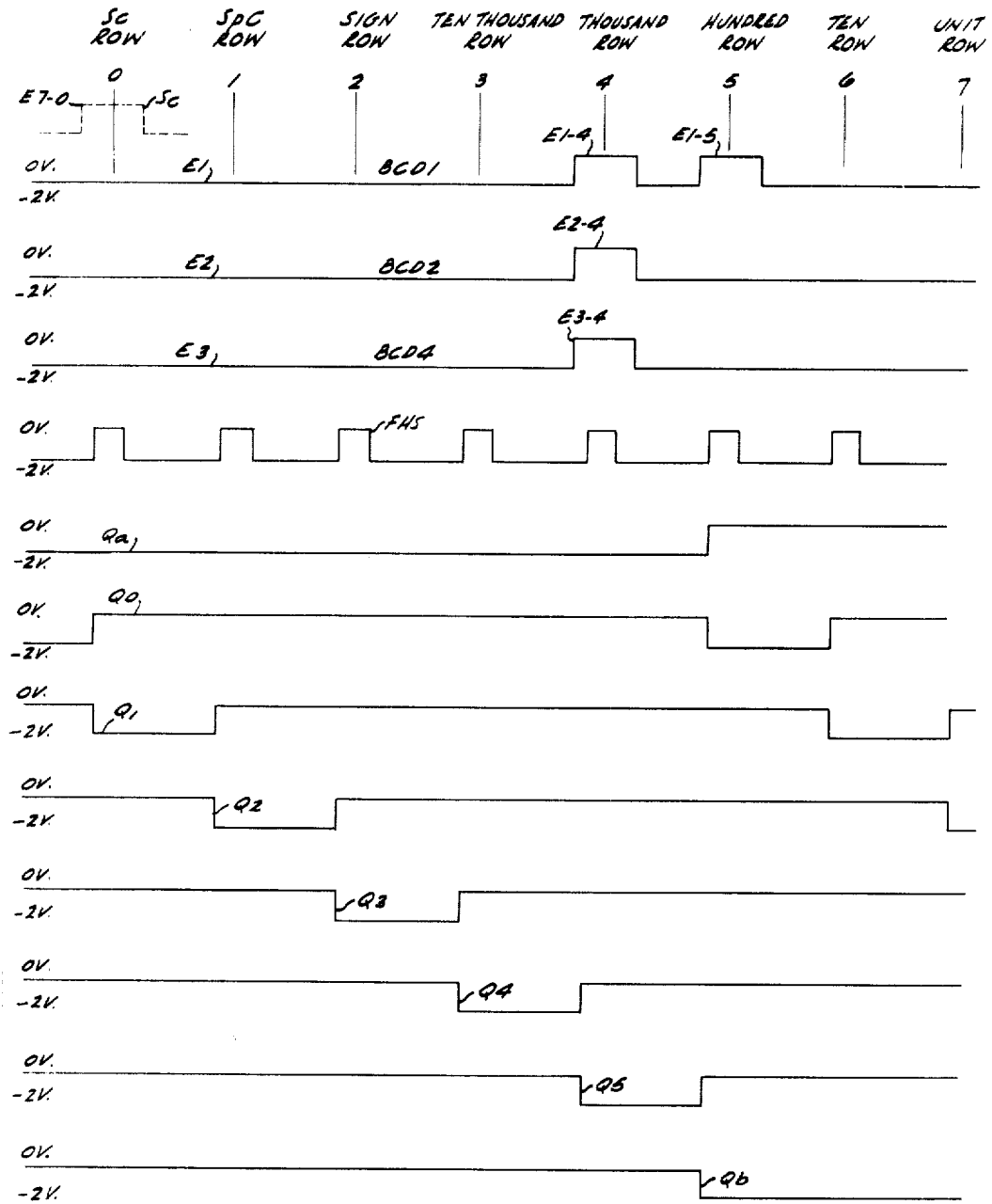

FIG. 7 diagrammatically illustrates a presetting circuit for the position counter employed herein;

FIG. 8 diagrammatically illustrates a gating circuit which is typical of the gating circuits employed herein;

FIG. 9 diagrammatically illustrates certain details of the signal shaper circuit employed in this invention;

FIG. 10 diagrammatically illustrates a tape reader control circuit including the resetting circuit for the tape row counter and the block memory circuit; and FIG. 11 is a timing diagram showing the timing of various signals.

Figure 1:
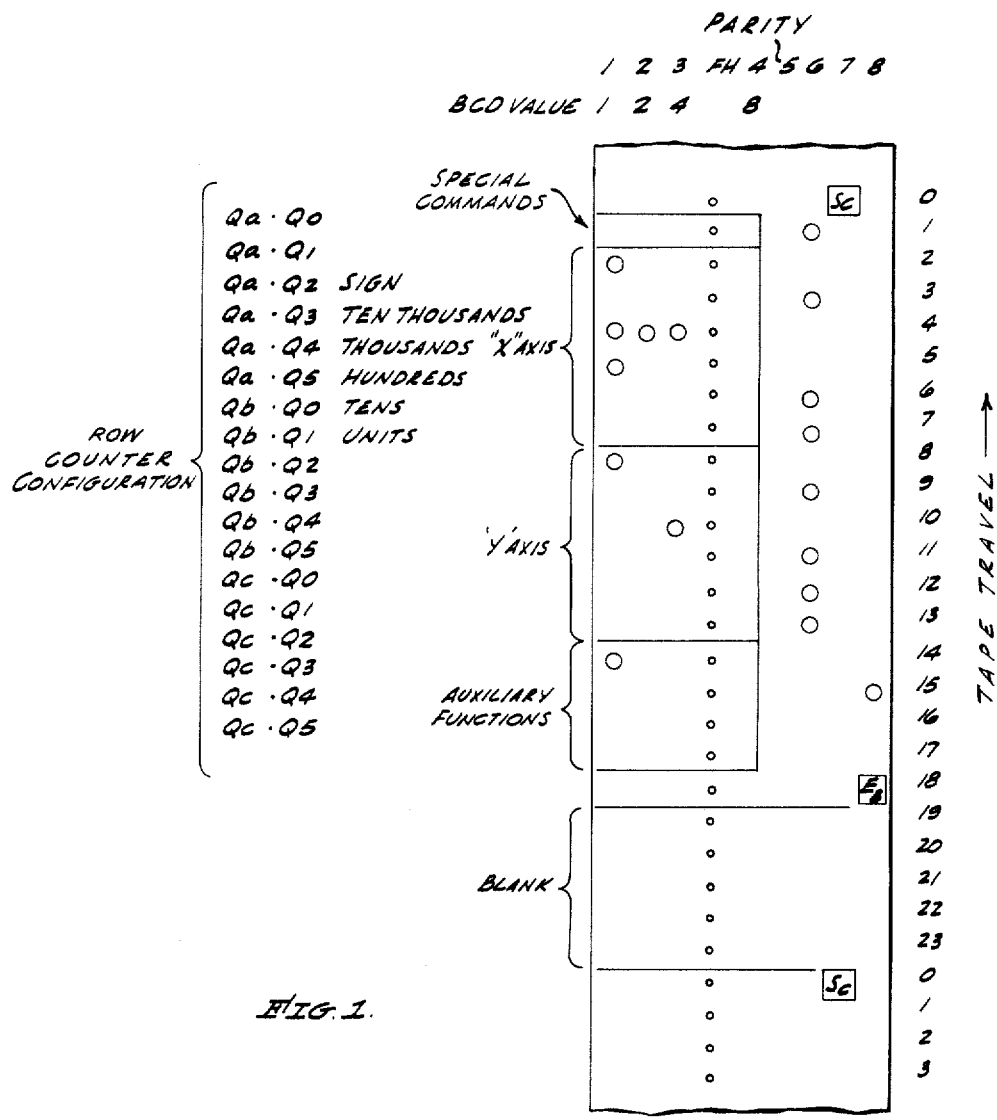
FIGURE 1 illustrates a typical tape format usable in practicing this invention.
Figure 3:
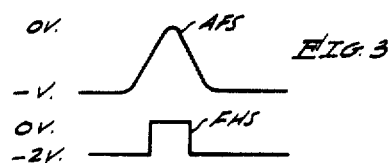
FIG. 3 is a diagram of a pair of signals showing particularly their relationship in time.

Referring to FIGS. 1, 2 and 3, the arrangement illustrated therein is primarily directed to the control of a machine tool MT wherein provision is made for special commands, for selecting a tool spindle, for controlling the direction of operation of a machine table or spindle along its axis of freedom and for controlling the actual position of a machine element, such as the machine table.

The machine tool MT is not illustrated in detail in the interest of simplicity. It may comprise conventional elements, such as a base, a machine table vehicle is mounted on a carriage movable along ways defining a predetermined axis of freedom and a tool spindle or a plurality of tool spindles with provision for selecting any one of such spindles. Such a machine tool includes power means for driving the machine table. For instance, such power means normally includes a lead screw which is rotated by a suitable motor system. In this instance two motors are indicated, one generally designated a drive motor DM and the other a creep motor CM, the drive motor being used to provide rapid traverse movement of the machine table, and the creep motor being used to drive the table at creep speed as the table moves into final position. The creep motor may be coupled into the drive system by means of a normally disengaged clutch (not shown). At such time as the system is to be switched from rapid traverse movement into movement at creep speed the drive motor may be braked, as by dynamic braking, and the clutch coupling the creep motor into the drive system energized and engaged. By this expedient the machine table is quickly braked to creep speed and driven at creep speed by the creep motor. Additional details of such an arrangement may be had by reference to application S.N. 23,568, entitled Electric Drive, by C. K. Howey, inventor, now Patent No. 3,127,790, and assigned to the assignee of this invention.

Such a machine tool is usually controlled by relays and/or contactors that is, heavy duty electrically operated switches. These have been identified as machine controls generally designated MC and including the necessary relays to effect switching of the character referred to in connection with control of the machine table under the influence of signals such as a rapid traverse signal RTS, a creep signal CS and a stop signal SP.

Such a machine tool may be controlled by a discrete signal type of program provided by a program controller, such as a tape reader system TRS, for instance. In this connection reference may be made to FIG. 1 which indicates a typical tape format of a type employable with this invention. In this illustration the tape is indicated as comprising 8 columns of information designated 1 through 8 and 1 feed hole column generally desigated FH. The tape is additionally divided into rows of information extending completely across the tape and each including a feedhole. These rows of information are numbered 0 through 18 for a full tape block and thereafter the row numbering sequence is repeated. An interblock space of 3 to 6 rows is left between blocks. Columns 1, 2, 3 and 4 of the tape are utilized to record the dimension for the movement of a machine axis and other items of information, such as tool selection (row 14) or certain special commands (row 1) dealing with the sequencing of the control. Column 5 is utilized as a parity check. The parity indicated is odd. Standard coding procedures indicate a zero row, i.e., a row without information, by punching a hole in column 6 in that row. A stop rewind signal may be generated by punching tape holes in columns 2, 4 and 6. Column 7 is utilized to provide a start code signal Sc and column 8 is utilized to provide an end-of-block Eb. The start code marker is positioned in column 7, row 0, of the tape as indicated. The tape is read in the direction 0 through 18, as indicated by the arrow. Thus, the first signal produced by the tape as the tape is advanced through the tape reader is the start code signal Sc. Row 1 of the tape may be utilized for special commands spelled out in a convenient code. Special commands in this instance may include, for instance, a delay command to interrupt the automatic cycle of the control, or a command to rewind the tape at the end of the operation, or a command to retract the positioning axes to their respective home positions. Rows 2 through 7 of the tape include dimension information for positioning purposes. Row 2, column 1, denotes the sign of the number. This determines the direction of movement and is utilized to set a suitable direction control, such as the direction control DC generally indicated in FIG. 2. For a D.C. motor drive system on the machine tool table such a direction control may simply switch the polarity of the armature circuits, assuming a Ward-Leonard type of drive, Row 3, columns 1 and 2 only, is utilized to denote tens of thousands. Row 4, columns 1 through 4, denotes thousands. Row 5, columns 1 through 4, denotes hundreds. Row 6, columns 1 through 4, denotes tens. And row 7, columns 1 through 4, denotes units. The maximum dimension which may be indicated under these circumstances in terms of suitable units is therefore 39,999.

In the machine tool application the transducer system is capable of producing 1 pulse for each one thousandth (.001) of an inch of movement of a machine element. In this particular application, therefore, the dimension specified on the tape is in terms of thousandths of an inch. As will be seen, a binary decimal code is employed on the tape. The perforations indicated on the tape in row 4 are made in columns 3, 2 and 1 which represents 7,000. In row 4, which is the hundredths row, a single perforation in column 1 has been made. The combined decimal notation is, therefore, 7, 100, specifying a dimension of 7.1 inches of movement in a particular axis.

For a two-axis system the information block is divided into two dimension sections. The first of these which has been discussed is identified as the "X" axis and the dimension extends through rows 3 through 7, row 2 representing the sign of the dimension. The dimension for the "Y" axis is similar to that for the "X" axis and includes the same number of rows. Here, a dimension of 4,000 one thousandths of an inch has been indicated with a perforation in the tape in row 10, column 3. Additional space is provided on the tape in rows 14 through 17 for programming auxiliary functions. Row 14 may include a code identifying a particular tool or a tool spindle which is to be selected for a particular machining operation. Among other things, such auxiliary functions may also include coolant flows during cutting operations. The number and character of these will depend upon the general organization of the tool. If an index table is provided, indexing may be specified at this particular point. Immediately following the auxiliary functions, an end-of-block marker is indicated in column 8. This end-of-block indication is not necessarily applied in a precise row. As a practical matter and as indicated herein, immediately following the only auxiliary function called for on the tape which is specified in row 14, column 1, an end-of-block perforation has been placed in column 8, row 15. This initiates an end-of-block or stop signal which is used to reset a tape row counter TRC, yet to be described. After the end-of block marker a series of blank rows are provided solely for the purpose of separating the blocks of information on the tape.

As mentioned hereinabove, a tape such as the tape illustrated in FIG. 1 may be read by a suitable photoelectric type of transducer. Under such circumstances the photoelectric devices which are employed will occupy one of two impedance or voltage states when dark, and a second impedance or voltage state when illuminated with light. In the arrangement herein described it will be assumed that the self-generating photoelectric devices will be in the higher of their two voltage states when dark, and in the lower of their two voltage states when light. A typical circuit for such devices is seen in FIG. 2 wherein the cathodes of the several photodiodes PD1 through PD8 for the information holes and PDFH for the feed or sprocket holes are commonly connected −2 volts. In FIG. 2 the photodiode PDFH is shown in a different location than it physically occupies, which is between photodiodes PD3 and PD4, in correspondence with the feed hole position on the tape. This change is made in the interest of drawing convenience.

The anodes of such photodiodes may be coupled to suitable conventional amplifiers, here designated only as blocks A1 through A8 and AFH for the respective information hole diodes and the feed hole diode. These amplifiers are so arranged under the control of inputs provided by the photodiodes of the tape reader that their outputs swing from some negative voltage toward ground or zero volts each time the diode is illuminated with light. Thus, when the diode is dark the amplifier outputs are at some predetermined negative voltage and when the diodes are illuminated with light the amplifier outputs are at about zero volts or ground.

The output of amplifier AFH is shown in FIG. 3 and designated AFS. This amplified feed hole signal is utilized to trigger a signal shaper circuit generally designated SSC in FIG. 2. This signal shaper circuit may be any suitable type of bistable electronic circuit or relay, as described hereinafter, capable of producing a substantialy rectangular timing or feed hole output signal designated FHS and illustrated in FIG. 3. As will be seen from FIG. 3, the timing or feed hole signal FHS swings between about −2 volts and zero volts or ground with each positive going excursion of the amplified feed hole signal AFS. At a predetermined value of the increasing amplified feed hole signal the signal shaper circuit operates and remains operating until a predetermined minimum value of the decreasing amplified feed hole signal obtains, at which time the signal shaper circuit abruptly cuts off and its output returns to −2 volts.

The output signal FHS of the signal shaper circuit SSC is provided as input to a tape row couner TRC which may be two ring counters connected in cascade, as hereinafter described, and having sufficient count capability to count the total number of rows required to read a full block of information, in this case rows 0 through 18. Such a tape row counter may include flip flops of the type hereinafter described having input circuits which are driven by the timing or feed hole signal FHS and which are placed and held in a predetermined electrical configuration prior to and up to the occurrence of the first feed hole signal which is to be counted, as determined by the start code signal. Such preliminary setting of the counter may be effected through suitable counter reset circuits under the control of a counter control circuit identified as a block memory circuit generally designated M, preferably of bistable character, which is switched between two stable electrical voltage states under the control of the start code signal Sc and the end-of-block or stop signal Eb. These signals which are amplified by amplifiers A7 and A8 are applied to the set and reset input terminals, respectively, of the block memory device M. With the occurrence of each end-of-block signal Eb, the block memory device is switched to the lower of its two voltage states, generally designated −150 volts, and in this position switches the tape row counter to its predetermined configuration and holds the counter in that configuration regardless of the generation of timing or feed hole signals FHS which would normally tend to drive the counter. The counter is held in this condition until such time as a start code signal Sc is generated. The application of this signal by circuit ScC to the set input terminal of the block memory switches the block memory device to the other of its two voltage states, viz., +25 volts, as indicated, to change the bias on the reset terminal of the tape row counter to permit counting of the successive feed hole signals as they occur.

The tape row counter TRC is used to enable selected gates of a gating matrix to gate the rows of discrete information signals to selected points in the system. As will be seen by reference to FIG. 1, row 1 of the tape is for special commands and includes spaces in the four columns 1, 2, 3 and 4 for four bits of information concerning special commands. For this situation the special commands include binary codes having the following effects on the system:

0—No command.
1—Delay the cyclic operation of the control.
2—Retract the positioning axes to their home positions.
4—Rewind the tape on the reader (includes delay).

8—Position X and Y axes but inhibit operation of the spindle feed mechanism (operation of the spindle feed mechanism usually follows X and Y positioning on the application in question).

These commands may be combined by entering in row 1 of the tape the binary codes representing the following:

3—Delay and retract.
5—Same as 4.
6—Retract and rewind.
7—Same as 6.
9—Delay and inhibit feed operation.

These form no part of this invention but are listed as typical types of commands that may be achieved by a suitable code in a single row.

Row 14 of the tape is, in this instance, to be utilized to select a tool from a tool storage matrix or a spindle on a turret type of tool such as a turret drill. Each angular position of such a tool storage matrix or such a multiple tool spindle may have a particular binary code which may be established by binary coded cam-operated switches, actuated whenever the tool magazine or the tool spindle is rotated, according to conventional practice. Non-coded cam-operated switches, i.e., switches arranged as one per spindle position and which are operated when the spindle is in that particular position, may also be used. The configuration of signals programmed on the tape in row 14, therefore, indicates a particular angular position of the tool magazine or the tool spindle.

Since the gates for special commands and tool selection are similar in principle, only the gating matrix for the special command circuits is illustrated. Four special command gates designated 1G1 through 1G4 are provided. Each of these gates has an enabling input applied thereto which is taken from the tape row counter TRC and which is identified RW1 signifying row 1 of the tape. Each gate has applied thereto an information signal circuit. The respective circuits are designated E1C through E4C connected with the outputs of the respective amplifiers A1 through A4 and providing for the application of signals E1 through E4 generated by perforations in tape columns 1 through 4 to the gates 1G1 through 1G4, respectively. Each such signal which is applied to the gate during enabling by signal RW1 is gated to the special command circuits SPC for the purpose of initiating the desired one of the several commands listed above.

Similarly, the tool selection circuit is instrumental, when enabled by signal RW14 of the tape row counter, in selecting a designated tool or spindle or, alternatively, as noted, this circuit may be utilized to control the indexing of a table mounting the workpiece on which the work is to be performed. These and other variations in application of a routine of auxiliary functions may be readily apparent.

Direction control involves a single bit of information. Usually, movement of the machine table out of home position to some position command by the tape program is identified as the positive direction of movement. The convention adopted herein is that a positive direction of movement must be identified or commanded by the presence of a hole in the tape in column 1, row 2, to denote the sign of the number. Signal RW2 at the output of the tape row counter TRC is therefore employed to enable a gate 2G1, whence the perforation in column 1 of the tape at the row 2 position results in the application of a signal via circuit E1C to the gate 2G1 which in turn applies a signal to the direction control circuit DC for selecting the direction of operation of the machine table. As earlier stated, if a direct current type of drive is employed, such control simply involves the switching of the armature voltage of the D.C. drive motor to obtain a particular direction of operation.

Information in the form of dimensions from tape rows 3 through 7 is gated to a position counter generally designated PC which is a binary coded decimal type of counter and includes flip-flop groups representing ten thousands, thousands, hundreds, tens and units, respectively. There are as many flip-flops in each of these groups as there are bits of information in a particular row. Thus, the ten thousands flip flop group includes only two flip flops and the remaining groups each include four flip flops. Signal RW3 is applied as an enabling signal to gates 3G1 and 3G2, the outputs of which are coupled as input to the ten thousands flip flop group (flip flops FQ$x$17 and FQ$x$18, FIG. 6) of the position counter and are used to correspondingly set these flip flops. The signals produced by these gates when the gates are enabled are the signals derived from row 3, columns 1 and 2, of the tape. Gates 4G1 through 4G4 enabled by tape row counter signal RW4 receive information signals E1 through E4 when tape row 4 is being read. The outputs of these gates are coupled to the respective flip flops FQ$x$13 to FQ$x$16 of the thousands group. Similarly, gates 5G1 through 5G4 enabled by tape row counter signal RW5 gate the signal information from row 5 of the tape into the hundreds position flip flops FQ$x$9 to FQ$x$12 of the position counter. Gates 6G1 through 6G4 and 7G1 through 7G4 are similarly enabled by signals RW7 and RW8 of the counter and gate the tens and units signal groups to respective flip flop groups FQ$x$5 to FQ$x$8 and FQ$x$1 to FQ$x$4.

Prior to the time that the position counter is set in correspondence with the dimension singals from the tape, the position counter is preset to a particular electrical configuration. In the arrangement herein described the counter is preset so that all of the flip flops are turned "on," that is, set in their "1" representing electrical state, prior to the time that information as to a dimension is read from the tape. Thus, the information read from the tape is used to turn off all of the flip flops for which there is no hole in the corresponding row-column location on the tape block. The flip flops for which there is a perforation on the corresponding tape block location are left on. Presetting of the counter is achieved by means of the application of a signal from the tape row counter, in this instance the signal RW1, denoting row 1 of the tape, so that with occurrence of row 3 of the tape, setting of the counter as indicated by the pattern of the information holes in the tape may take place.

The output of the positon counter as indicated in FIG. 2, in the interest of convenience, is represented as a single circuit which is applied as input to a logical gating circuit, generally designated LG. Such a gating circuit may be of relatively simple configuration and may comprise a first gating section representative of a predetermined count of the counter denoting an anticipation distance. For instance, for a particular speed of the machine tool the anticipation distance at which the tool is to be switched from rapid traverse to creep speed may be of the order of .039 in., say, as a minimum and may be any larger value which is desired within the limits of the equipment. A second gate may be employed to anticipate stopping. When the machine is operating at creep speed its speed is sufficiently low that anticipation of stopping may take place at .002 in. or .003 in. from final stopping position. Hence, a gate receiving position counter signals denoting this particular distance may be utilized to initiate the stop signal.

As earlier described, rapid traverse is under the control of the drive motor. The occurrence of the creep signal operates the machine controls MC to dynamically brake the drive motor and activate the clutch engaging the creep motor in the drive motor drive train and the occurrence of the signal configuration for stop results in deenergization of both the drive and the creep motors and the machine table or carriage thereafter coasts to a stop at the desired position.

The logical gating circuits are indicated as a block associated with a second block designated EL and representing electronic circuits. Such a block conventionally will include suitable amplifiers to provide signals capable of driving relays or contactors of the type which are employed in the machine controls.

Flip flops

A better understanding of this invention may be had by referring to certain detailed aspects of the circuits which are involved herein. Reference has been made to a tape row counter and to a position counter herein. Each of these counters includes flip flops. The flip flops may all be the same for the purposes of this discussion and to this end a typical flip flop has been illustrated in FIG. 4.

This flip flop comprises a pair of transistors Q11 and Q12 of the P-N-P type which are connected in grounded emitter configuration. The bases and collectors of these transistors are cross connected in respective voltage divider circuits, the first including resistors R22, R23 and R24 and the second including resistors R25, R26 and R27. The base of transistor Q11 is connected to the common terminal of resistors R22 and R23 of the first voltage divider and the base of transistor Q12 is connected to the common terminal between resistors R25 and R26 of the second voltage divider. The collector of transistor Q11 is connected to the common terminal between resistors R26 and R27 of the second voltage divider, and the collector of transistor Q12 is connected to the common terminal of resistors R23 and R24 of the first voltage divider.

The respective voltage dividers during operation of the flip flop are normally connected between +25 volts and —25 volts. For the purpose of presetting the flip flop to one of its two stable states a selected one of the terminals S or R on the voltage divider circuits may be connected to —150 volts. When —150 volts is connected to terminal S the flip flop is turned "on," its "1" representing electrical state, and when —150 volts is connected to the terminal R the flip flop is turned "off," its "0" representing electrical state. While the application of —150 volts is shown only at terminal S, by means of a circuit described hereinafter, it is to be understood this voltage may be applied to either of the terminals S or R, depending upon the electrical state the flip flop is to be set in prior to operation.

Resistors R23 and R26 are respectively shunted by capacitors C6 and C7, resistor R23, capacitor C6, resistor R 26 and capacitor C7 constituting respectively the cross-coupling circuits connecting the collector of one transistor to the base of the other transistor to provide fast triggering.

The base circuits of the transistors are respectively provided with steering voltage connections to provide switching of the flip flops from one electrical state to the other without uncertainty. These circuits include resistor R28, diode D14 and resistor R29, diode D15 in series between the collector and base of transistor Q11 and the collector and base of transistor Q12 respectively.

J input signals at terminal JP are applied to the base of transistor Q12 through a coupling capacitor C8 and the diode D15. K input signals are applied at terminals KP or KN to the base of transistor Q11. Signals at terminal KP are coupled through a capacitor C9. A coupling capacitor C11 couples signals applied at terminal KN to the base of transistor Q11. Another input terminal designated 81n is coupled through a polarizing diode D19 into the base of transistor Q11. An input terminal T is coupled to the base of transistor Q11 through a diode D19 and a capacitor C10. A resistor R9 couples the common terminals of the diode and capacitor to the collector of transistor Q12 and applies a potential to input circuit T. Input terminal T is used only in the tape row counter TRC. Clamping diodes D16 and D17 are provided respectively at the collector circuits to apply a clamping voltage of —2 volts, as indicated, such that when either transistor Q11 or Q12 is not conducting the associated collector circuit will be clamped at —2 volts.

The "on" or "1" representing electrical state of such a flip flop is an approximate —2 volt state at collector terminal Q and the "off" or "0" representing electrical state is an approximate zero or ground voltage condition at terminal Q̄. For the flip flop to be in its "on" or "1" representing electrical state transistor Q11 is conducting and transistor Q12 is nonconducting. Under this condition terminal Q is at —2 volts as determined by the voltage clamp at diode D16. As a consequence of current flow in the collector circuit of transistor Q11, including resistor R27, the Q̄ terminal of the flip flop will be at approximately zero volts, in which case the clamping diode D17 is back biased.

The flip flop is triggered between its two electrical states by cutting off the conducting transistor through the application of a positive voltage pulse to its base. The steering voltages applied by the steering voltage circuits, including resistors R28 and R29 as described hereinabove, permit control of the flop flop by the simultaneous application of positive voltage pulses to both the terminals JP and KP in the position counter application, for instance, such as the voltage pulses P from the output of the pulse generator in FIG. 2, each representing .001 in. increments of displacement of the machine table.

Figure 4:
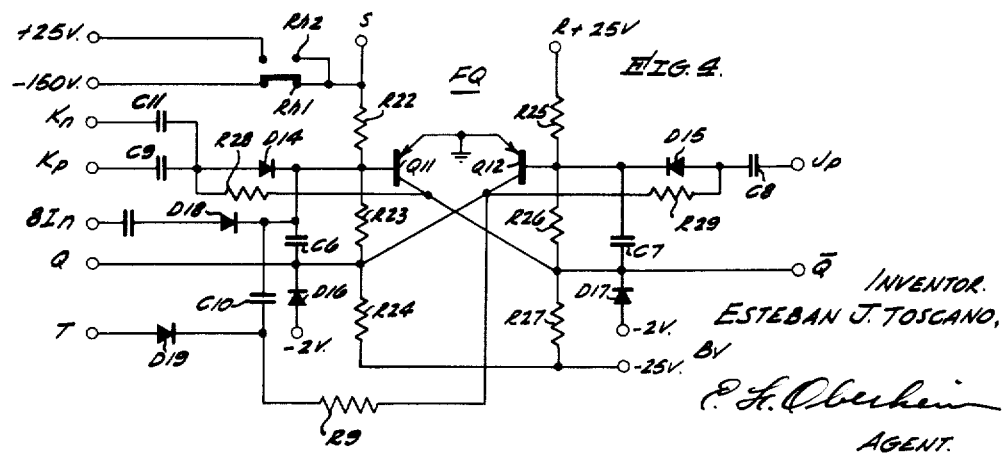
FIG. 4 is a circuit diagram of a typical flip-flop employed in this invention.

FIG. 4 also illustrates a specific circuit for setting the flip flop in its "1" representing electrical state using the principle of negative base bias. This provision, with reference to the flip flops of the tape row counter TRC, includes the normally closed contacts RH1 of a hold relay RH, yet to be described. In normal operation both of the voltage divider circuits are connected between +25 volts and —25 volts. This is the condition in which the relay RH is energized closing the contacts RH2 applying +25 volts to the terminal S. The terminal R has +25 volts permanently connected thereto in this particular showing. In order to set the relay into its "1" representing electrical state contacts RH1 are closed connecting —150 volts through resistor R22 to the base of the transistor Q11. The base of transistor Q11 under these circumstances is driven negative with respect to the emitter and conduction takes place. As long as this voltage is applied the flip flop is held in this electrical state even though positive voltage pulses may be applied to JP and KP.

Tape row counter

Figure 5:
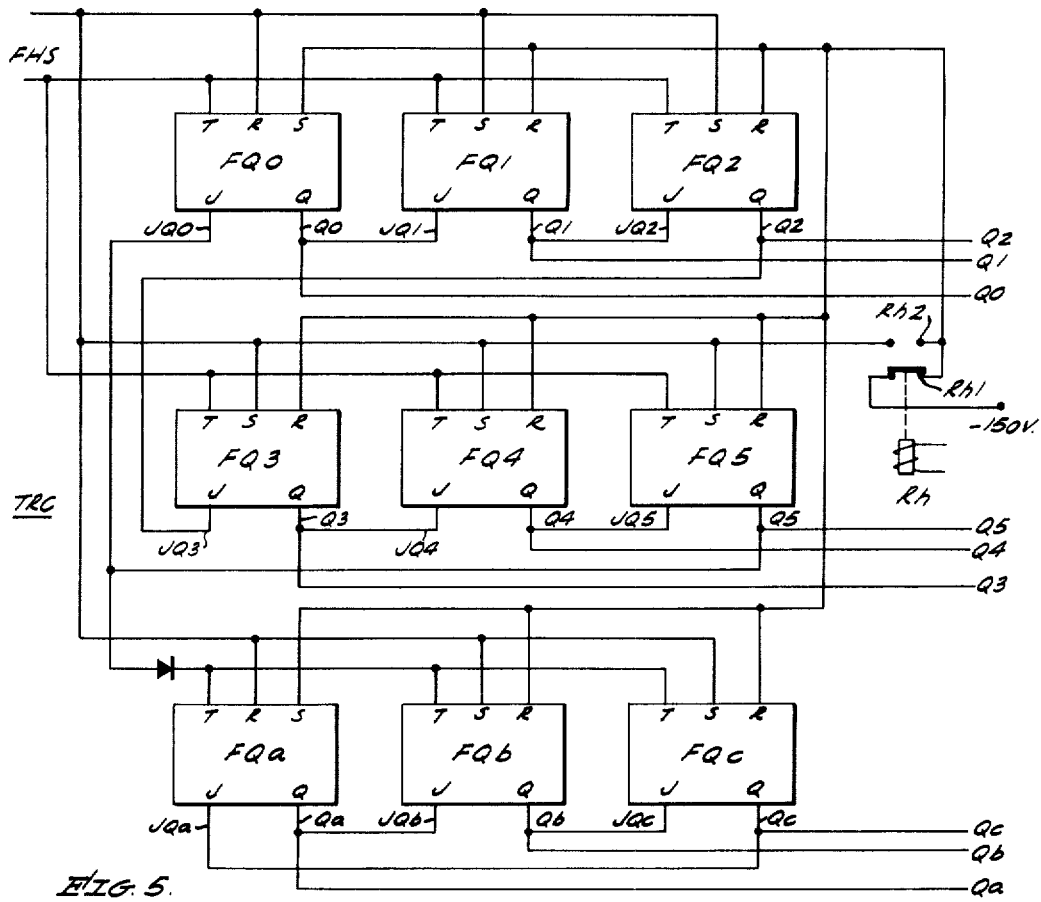
FIG. 5 is a block diagram of the tape row counter employed in this invention.

The tape row counter TRC illustrated in FIG. 1 is further detailed in block form in FIG. 5. It comprises two interconnected ring counters, the first of which includes six cascaded flip flops designated FQ0 through FQ5, and the second of which includes 3 cascaded flip flops FQa, FQb and FQc. These flip flops individually may be the same as that described in FIG. 4. However, all of the terminals indicated in FIG. 4 are not utilized in the circuit connections among the various flip flops. As noted above, input termianl T is used to trigger the flip flops in the tape row counter TRC. As will be seen, the Q output terminal of each of the flip flops is connected to the J input terminal of the next higher order flip flop in the chain in both sections of the counter. Additionally, the Q output terminal, designated Q5, of flip flop FQ5 is connected directly to input terminal JQ0 of flip flop FQ0 and is connected through a coupling diode to the input circuits T of each of the flip flops FQa, FQb, FQc. A voltage of +25 volts is permanently connected to the R input terminal of each of the first stage flip flops FQ0 and FQa, respectively, of the two sections of the counter TRC and to the S terminals of the remaining flip flops of both counter sections. The S terminal of flip flop FQ0 and the S terminal of the flip flop FQa are connected in common with the R terminals of the remaining flip flops and are connected through the normally closed contacts RH1 of a relay RH to a supply of −150 volts. Contacts RH2, normally open, of this relay connect +25 volts to all of these last named terminals when this counter is to be switched to its counting mode of operation.

The counter is operated by the timing or feed hole signal FHS described in connection with FIG. 2 and illustrated in FIG. 3. This signal is applied to all of the T input terminals of the flip flops FQ0 through FQ5 constituting the first section of the counter. Both the first and second sections of the counter are connected as ring counters by circuits connecting the Q output terminals of the last flip flop of each section to the J input terminal of the first flip flop of each section, that is, terminal Q5 is connected to input terminal JP0 and terminal QC is connected to input terminal JQa With the connections indicated when this counter is reset by application of −150 volts and by reference to the discussions concerning the individual flip flops made in connection with FIG. 4, it will be seen that the flip flops FQ0 and FQa will be switched to their "1" representing electrical states and the remaining flip flops are switched to their "0" representing electrical states with the application of −150 volts through the contacts RH1 of the relay RH.

Assuming that this counter has been set by the application of −150 volts and that the start code signal has occurred, it will be seen that application of the positive going portion of signal FHS to the respective terminals T switches flip flop FQ0 from its "1" representing electrical state to its "0" representing electrical state. The steering provided within each flip flop of the input terminal T insures that only a flip flop in the "1" representing state will respond to the signal FHS by going to the "0" representing state. In the "1" representing state transistor Q11 is conducting and transistor Q12 is cut off. Hence, both terminals of resistor R9 will be at −2 volts. In particular, the junction of diode D19, resistor R9 and capacitor C10 will be at −2 volts, and when the signal FHS on the anode D19 goes to ground, the above-described junction goes to ground and the positive going signal is coupled through capacitor C10 to the base of transistor Q11 which is turned off initiating the regenerative action that changes the state of the flip flop. If, on the other hand, the flip flop is in its "0" representing state, then transistor Q11 is off, transistor Q12 is conducting and its collector is at ground. Hence, the junction of diode D19, resistor R9 and capacitor C10 is also at ground and diode D19 is back biased having its anode at −2 volts and its cathode at ground. No change in the junction voltage can result from the anode of diode D19 going to ground and therefore no signal is coupled into the flip flop.

Recalling that the "1" representing electrical state of the flip flops is represented by a negative voltage at the terminal Q, switching off of the flip flop FQ0 switches the output terminal Q from a negative voltage state to approximately zero voltage or ground potential. This positive going voltage applied to the Jp input terminal JQ1 of the flip flop FQ1 applies a positive going bias to the base of the transistor Q12 (see FIG. 4) which is conducting when the flip flop is in its "0" representing electrical state. This cuts off the transistor Q12 and the flip flop FQ1 switches to its "1" representing electrical state. The next positive going portion of the feed hole signal on terminal T switches off the flip flop FQ1 and the rising voltage on the output terminal Q1 applied as input to the Jp input terminal JQ2 of flip flop FQ2 switches the flip flop FQ2 to its "1" representing electrical state.

By this means the flip flops are successively switched to their "1" representing electrical states from the least significant flip flop FQ0 of the first section through the most significant flip flop FQ5. When flip flop FQ5 is switched from its "1" representing electrical state it switches flip flop FQa from its "1" representing electrical state to its "0" representing electrical state which switches flip flop FQ6 to its "1" representing electrical state. Flip flop FQ5 when switching from its "1" representing electrical state also switches flip flop FQ0 from its "0" representing electrical state to its "1" representing electrical state. As noted in FIG. 1 the electrical configuration Qa and Q0 of the counter denotes row zero (RW0) of the tape and the flip flop configuration Qc and Q5 denotes the maximum count of the counter which is row 18 (RW18) of the tape. In view of the fact that each section of the counter is a closed ring, when the counter is in its Qc, Q5 configuration, the next succeeding feed hole signal FHS is effective to step the counter to the electrical configuration Qa, Q0.

It will be noted that the relay RH is effective to reset the counter at any point in the count cycle. Additionally, note is again made of the fact that the negative biases on the bases of the respective transistors, provided by the −150 volt supply coupled through the contacts RH1, are sufficient to prevent flip flop triggering in the presence of timing or feed hole signals. Thus, the counter may be held in a particular configuration until such time as a start code signal Sc is applied as described in connection with FIGS. 1 and 2 and as will be described in greater detail hereinafter.

*Position counter*

Figure 6:
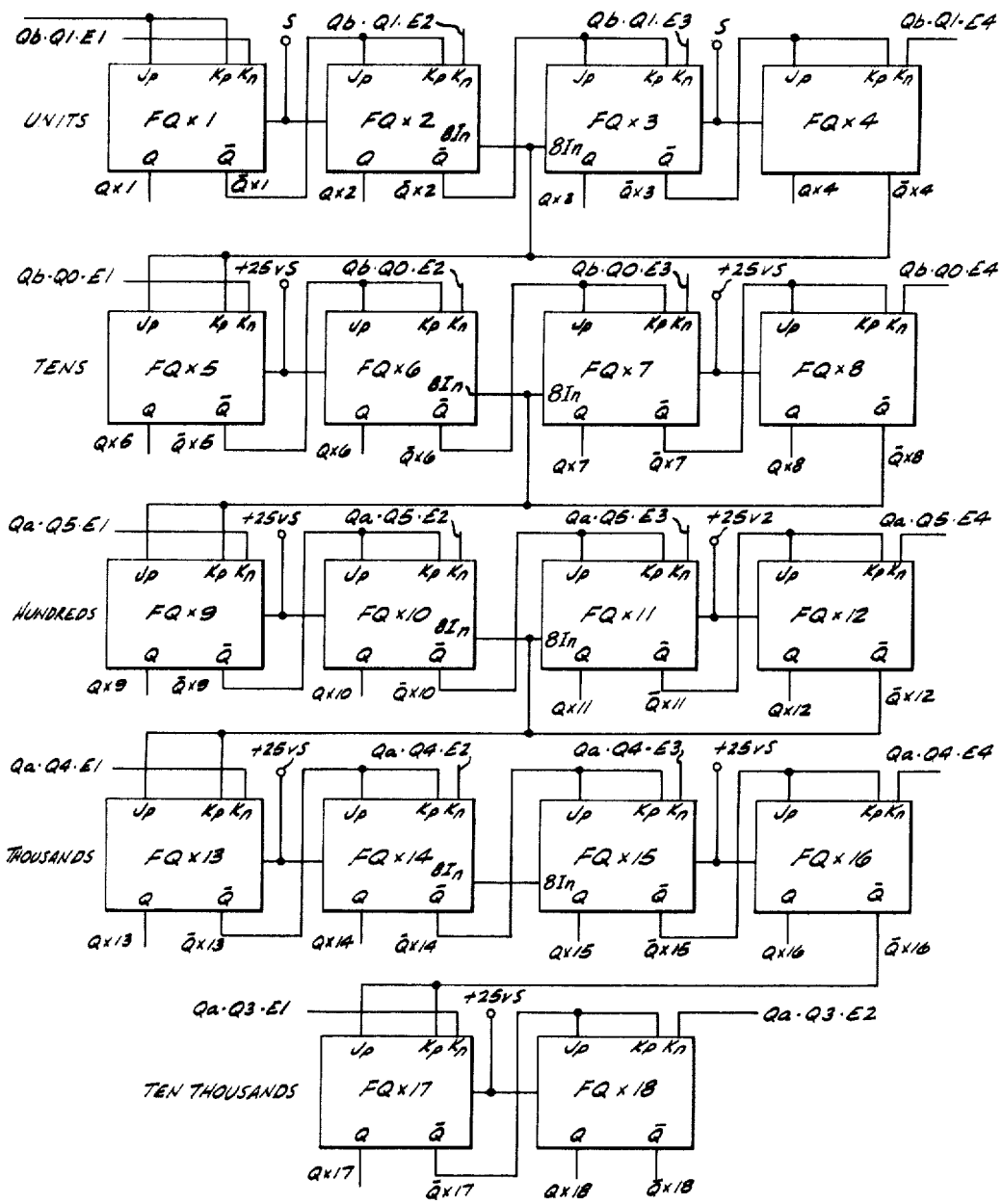
FIG. 6 is a block diagram of a position counter employed in this invention.

The position counter PC illustrated in FIG. 2 in block form is shown in greater detail in FIG. 6. This is a binary coded decimal counter and it comprises flip flops FQx1 through FQx18. Through the thousands level it is divided into groups of four flip flops. The flip flops FQx1 through FQx4 are the units flip flops. The flip flops FQx5 through FQx8 are the tens flip flops. The flip flops FQx9 through FQx12 are the hundreds flip flops. The flip flops FQx13 through FQx16 are the thousands flip flops. Two flip flops FQx17 and FQx18 are the ten thousands group flip flops. This counter as described in connection with FIG. 2 has a capacity of 39,999 which in the present instance represents thousandths of an inch.

In operation this counter is provided with connections whereby all of the flip flops are set to their "1" representing electrical states prior to the time that information concerning a particular dimension is inserted therein. At any time a row of information is being read the absence of a hole at a particular point on the tape is effective to turn "off" the corresponding flip flop.

The gating is such as described in connection with FIG. 2 that each of the four bits of dimensional information in a single row is read simultaneously and inserted into the respective flip flops. The lowest number flip flop in each row of the counter corresponds to the first column of the tape and the highest number flip flop in each row corresponds to the highest column, that is, column 4 of the dimensional information in the tape.

The counter is connected for count down operation and is operated as a binary coded decimal count down counter. To this end each $\overline{Q}$ terminal of a flip flop is coupled into both the JP and KP terminals of the next higher order flip flop in the counter with the exception of flip flop FQx18. The JP and KP terminals of flip flop FQx1 are coupled to the output of the pulse generator PG (see FIG. 2), the ouput pulses P of which trigger this flip flop in synchronism with pulse generation.

Binary coded decimal count down operation is achieved in each row by suitable interconnection of the circuits 8In of the "2" weighted and "4" weighted flips flops with the $\overline{Q}$ terminal "8" weighted flip flops. With reference to the units row of flip flops FQx1 through FQx4, the output terminal $\overline{Q}x4$ of the flip flop FQx4 is connected to the 8In input terminal of both flip flops FQx2 and FQx3. When this row of flip flops is in the 0000 configuration the next succeeding pulse P on the inputs JP and KP of flip flop FQx1 switches this flip flop to its "1" representing electrical state. One flip flop now switches the other to its "1" representing electrical state.

When flip flop FQx4 switches from its "0" electrical state to its "1" representing electrical state the positive going voltage couped to terminals 8In of both of flip flops FQx2 and FQx3 switches these flip flops from their "1" representing electrical states to their "0" representing electrical states. The configuration of the units row is now 1001 or decimal number 9. Similar considerations apply to the tens, hundreds and thousands flip flops.

*Position counter control*

Setting of all of the flip flops of the position counter in their "1" representing electrical states is accomplished accomplished as indicated generally in FIG. 2 by the application of the electrical signal RW1 to a relay driver generally designated RD, the output of which controls a relay RS, the contacts of which control the voltage applied to the set terminals S of each of the flip flops in the position counter. The details of this circuit are illustrated in FIG. 7. Here, the signals Qa and Q1 of flip flops FQa and FQ1 of the tape row counter TRC, identifying row RW1 of the tape, are coupled as inputs to diodes Da and D1 of an "end" gate including a pull down resistor R6 which is connected to −25 volts. In the condition in which the flip flops FQa and FQ1 are in their "1" representing electrical states, both the signals Qa and Q1 will be at −2 volts and the output of the gate will be approximately −2 volts. This signal is coupled to the base of a transistor Q14 having a grounded emitter and functioning as a relay driver. This negative signal causes the transistor Q14 to conduct energizing the coil of a counter set relay RS.

Relay RS is normally deenergized, in which condition it applies +25 volts to the terminal S of each of the flip flops FQx1 through FQx18 of the position counter as required for normal operation. However, when relay RS is energized the contacts RS1 are opened and the contacts RS2 are closed, connecting each of the S terminals of this group of flip flops to −150 volts. As will be seen by reference to FIG. 4 coupling of terminals S to −150 volts negatively biases the base of transistor Q11 with respect to the emitter causing conduction and forcing the flip flop into its "1" representing electrical state. Thus, in the condition defined by the tape row counter signals Qa and Q1 the position counter flip flops are set in their "1" representing electrical state. As the tape row counter steps to its next configuration the relay RS drops out restoring each of the terminals S to +25 volts. The flip flops, however, remain in their "1" representing electrical states.

With the occurrence of the signals Qa and Q3 of the tape row counter representing row 3 of the tape, the gates 3G1 and 3G2 are enabled. Since there are no holes in the tape the flip flops FQx17 and FQx18 are turned "off," that is, to their "0" representing electrical states. Similarly, as the gate groups 4G1 to 4G4, 5G1 to 5G4, 6G1 to 6G4 and 7G1 to 7G4 are enabled, the corresponding signals E1 to E4 are gated to the respective flip flop groups, turning "off" all flip flops when holes are lacking in the tape and leaving "on" all flip flops associated with a hole in the tape.

*Gate circuits*

FIG. 8 shows the details of a typical gating circuit and shows the interconnection of two gates. The gate 3G1 comprises a pair of gate diodes D27 and D30 and a pull down resistor R35 which is connected to −25 volts. Diodes D28 and D29 couple the signals Qa and Q3 (RW3) to the diode D30 of this gate. The output of amplifier A1, represented in circuit E1C, is coupled to the gate diode D27. Circuit E1C includes a resistor R33 having one end connected to −25 volts and a clamping diode D25 having its anode connected to −2 volts. A polarizing diode D26 has its anode coupled to the anode of the gate diode D27. The anodes of diodes D26 and D27 are connected by resistor R33a to a +25 volt supply.

Gating circuit 3G2 is similar to that just described, including gate diodes D34 and D33, pull down resistor R38 connected to −25 volts, the output circuit E2C of amplifier A2, including resistor R36 connected to −25 volts, clamping diode D31 having its anode connected to −2 volts, polarizing diode D32 having its anode connected to the anode of diode D33 and resistor R36a coupling the anodes of diodes D32 and D33 to +25 volts. The input of amplifier A1 is supplied by photodiode PD1 and the input of amplifier A2 is supplied by photodiode PD2 (see FIG. 2).

At such time as a hole appears in the tape the output of the corresponding amplifier rises from some negative voltage towards zero voltage or ground. The signals Qa and Q3 together indicate that row 3 of the tape is being read. These signals when true are both low. If there is no hole in the tape at photodiode PD1 or PD2 the inputs to the amplifier A1 and A2 are high and consequently the outputs are low. As the tape steps or moves from the position Qa, Q3 the flip flop Q3 changes to its "0" representing electrical state in which the signal Q3 suddenly goes high. Since signals E1 and E2 are both low this signal is coupled to the input terminals Kn of both flip flops FQx17 and FQx18. This positive going signal cuts off the transistor Q11 in each of these flip flops to switch the flips flops from their "1" representing electrical state to their "0" representing electrical states which satisfies the condition required for the code indicated on the tape.

If there had been a hole in either or both of columns 1 and 2 in row 3 the output of the amplifiers A1 or A2, or both, would have risen toward zero potential. With reference to amplifier A1, this rising voltage at the cathode of diode D26 raises the output of the gate applied to the terminal Kn of flip flop FQx17 toward zero potential. The charging rate of the coupling capacitor C11 coupling the terminal Kn to the base of the transistor Q11 is limited by the resistor R33a and is a positive going ramp type voltage rather than a positive going pulse type of voltage as required for triggering the flip flop. Consequently, the flip flop does not change its electrical state. The other gates are similarly operated. Thus, the behavior of the gates 4G1 through 4G4 will be understood in setting the flip flops FQx13 to FQx16 in an electrical configuration defined by 1110. In other words, only the flip flop FQx16 is turned off as a consequence of the absence of a hole in the tape. In the hundreds row, flip flop FQx9 remains on and flip flops FQx10 through FQx12 are turned off. The remaining flip flops in the tens and units groups of the position counter are also turned off in this manner. The signals which are instrumental in achieving this character of operation are referenced adjacent each of the terminals Kn of the flip flops of the position counter as depicted in FIG. 6.

*Signal shaper circuit*

The signal shaper circuit SSC of FIG. 2 is illustrated in detail in FIG. 9. This circuit comprises a feed hole relay RFH having a set of normally closed contacts RFH1. The coil of relay RFH is connected between ground and −25 volts in series with a resistor R31. The output circuit AFC of the feed hole amplifier AFH is coupled between resistor R31 and the coil of relay RFH. Each time a feed hole permits the photodiode PDFH to be illuminated with light the output of the feed hole amplifier rises from a negative voltage towards ground or zero volts, as explained in connection with FIG. 3. This rising voltage reduces the voltage across the feed hole relay and thus the relay drops out at a particular point on the output voltage cycle of the feed hole amplifier. The contacts RFH1 of the feed hole relay are connected on one side to ground and on the other side to the anode of diode D24. The cathode of the diode D24 is connected to the cathode of a clamp diode D23, the anode of which is connected to −2 volts. The common cathodes are connected to —25 volts through a resistor R32. The cathode circuits constitute the output circuit SC of the signal shaper producing the square wave signal FHS approximately as indicated. Although a relay has been illustrated as a means of mechanizing the signal shaper circuit it will be appreciated that other suitable types of devices such as flip flops, Schmitt triggers or other squaring circuits may be employed to obtain the square wave output signal which is desired.

*Block memory circuit*

The block memory circuit M, together with tape reader control circuits, is illustrated in detail in FIG. 10. This circuit comprises a hold relay RH and a block relay RB. The coils of these relays are connected in parallel between ground and —25 volts through the normally open contacts RB2 of the block relay RB and a resistor R30. Ground potential is normally applied to this circuit in parallel with the contacts RB2 by the output of the amplifier A7 which is responsive to the start code hole on the tape. The output circuit of the amplifier A7 is designated ScC and represents the set input of the block memory M as indicated in FIG. 2. The relays RB and RH are further controlled by means of a tape forward relay RTF having normally closed contacts RTF1 connected in series with a polarizing diode D21 between ground and the resistor R30. This circuit shunts and deenergizes the coils of relays RB and RH whenever the tape forward relay RTF is deenergized.

One side of the coil of the tape forward relay RTF is grounded through a switch SS whenever this switch is in its "on" position. The other side of the coil of relay RTF is connected through a diode D36 to a set of normally open contacts RP1 of an operation pending relay RP which when closed grounds the cathode of this diode. A resistor R37 is coupled between the cathode of diode D36 and —25 volts. A diode D22 also having its anode connected to the anode of diode D36 also couples the coil of relay RTF to the output circuit of the amplifier A8 controlled by the end of block signal Eb and to the resistor R30.

As indiciated in FIG. 2, the operation pending relay may be controlled from the logical gating circuit LG and the tool select circuit TS. This is merely representative. In practice it is desirable to hold relay RP energized until the last operation is completed. The operation pending circuit OP may be a simple "and" gate. The tape forward relay RTF includes additionally normally open contacts RTF2 which are connected to a tape reader motor TRM, or a clutch, and which are utilized to start the tape reader.

When there is no operation pending, relay RP is deenergized and contacts RP1 are open. If the tape is not at end-of-block position, the output of amplifier A8 is low. Normally closed contacts RTF1 of the tape forward relay couple ground or zero potential to resistor R30 preventing relays RB, RH and RTF from being energized in a circuit including resistor R30. When switch SS is placed in "on" position under these conditions the coil of relay RTF is energized through resistor R37. When contacts RTF1 open, ground potential is removed from resistor R30. When contacts RTF2 close, the tape reader is started. If the tape had been at end-of-block position the tape reader would still have started. The output of the end-of-block amplifier appears only on resistor R30 because of the operation of diode D22 which isolates the amplifier from the circuit of resistor R37. When the tape is moved from end-of-block position the output of amplifier A8 again falls. Momentarily, both resistors R30 and R37 are now in the holding circuit for the coil of relay RTF. The hold relay RH includes a set of normally closed contacts RH1 and a set of normally open contacts RH2. These have been referred to in connection with the description of the tape row counter in FIG. 5 hereinabove. When contacts RH1 are closed —150 volts is applied to the selected set and reset terminals of the flip flops of the tape row counter TRC and its electrical configuration is Qa and Q0. The counter holds in this configuration regardless of the presence of feed hole signals FHS on the input circuits T of the several flip flops because of the overriding bias provided by the —150 volts signal applied by the contacts RH1. With the occurrence of the start code signal Sc relays RB and RH are momentarily energized. Contacts RB2, now closed, complete the holding circuit for the coils of both of these relays and +25 volts is switched to the terminals of the flip flops of the tape row counter which were formerly biased by the —150 volts supply to set the counter for normal operation. The feed hole signals which now appear on the input terminals are effective to step the tape row counter TRC. When the tape is being read the operations pending relay is energized and applies ground potential to resistor R37 when contacts PR1 close. The tape forward relay remains energized by the circuit through resistor R30.

When the entire block of tape has been read and the end-of-block signal Eb occurs the output of amplifier A8 rises to ground potential. This is coupled to resistor R30 and removes voltage from the coils of relays RB, RH and RTF which now drop out. When the tape forward relay drops out contacts RTF1 hold resistor R30 at ground potential disabling the relay energizing path through resistor R30. The contacts RH1 of relay RH reset the tape row counter to the electrical configuration Qa, Q0. The circuit remains in this electrical state until all operations are completed, at which time the operation pending relay RB drops out opening contacts RP1. This initiates another cycle of operation by energizing relay RTF which starts the tape and reading of the next block of tape takes place.

The timing of the several elements of the information distribution system which have been discussed hereinabove is indicated in FIG. 11. The signals which are depicted herein are idealized concepts of signal shapes and are not to be construed as representing the exact signal shape which is under consideration. For the purpose of convenience and description only the signals E1 through E3 of the tape information signal amplifiers A1 through A4 have been depicted in FIG. 12. The start code signal has been indicated in an arbitrary column position in dotted outline in a position in row zero.

In FIG. 11 the rows of the tape have been represented as vertical columns representing row 0 through row 7 which covers the informtion on the tape through the dimensions for movement in the X axis. The signals E1 through E3 exists in two voltage states which are here typically represented as rectangular wave shapes swinging between —2 volts and zero volts. The voltage excursions on the signals E1 through E3 are dipicted according to the perforations of the tape shown in FIG. 1. Hence, in row 4 the voltage excursion E1-4 is shown and in row 5 the voltage excursion E1-5 is shown. Voltage excursions E2-4 and E3-5 are shown in row 4 for each of the signals E2 and E3. The tape feed hole signals FHS are depicted as rectangular voltage waves approximately centered with each row of the tape. These it will be noticed, are considerably narrower than the tape information signals such as E1 through E4. The signals of the flip flops of the tape row counter TRC are depicted below this group of signals. Initially, the flip flop Qa is set in its "1" representing electrical state in which the output Qa is —2 volts. This flip flop remains in this electrical state until the output of the flip flop Q5 changes from its "1" state, which is negative, to its "0" state which is at zero or ground potential, at which time the output Qa of the flip flop FQa switches to zero voltage and the output Qb of the flip flop FQb switches to —2 volts.

Assuming that the start code position has not been reached on the tape but that the tape is moving, as the tape reaches the start code position the signal Sc is generated. This signal switches the output of the block memory circuit M from −150 volts to +25 volts (see FIG. 10) and sets the tape row counter for operation. The feed hole signal FHS in tape row zero now appears at the input of the tape row counter and switches the flip flop Q0 from its "1" representing electrical state to its "0" representing electrical state. As the output Q0 of this flip flop rises it triggers the flip flop Q1 to its "1" representing electrical state, viz., −2 volts as shown. The flip flop Q1 holds until the next occurrence of a feed hole signal. The positive going portion of this feed hole signal as described is effective to switch the flip flop Q1 from its "1" representing electrical state to its zero representing electrical state. This character of operation continues through the flip flop FQ5, at which time the positive going output of the flip flop FQ5, as it is switched from its 1 to its zero electrical state, turns "off" the flip flop FQ$a$, which in turn switches the flip flop FQ$b$ to its "1" representing electrical state, producing the output Q$b$ as indicated.

As earlier described herein in connection with FIG. 8, reference was made to switching of the flip flops of the position counter PC by the outputs of gates such as 3G1 and 3G2. In this description reference was made to the fact that the absence of a change in a signal, such as signals E1 through E4, for example, was effective to switch a position counter flip flop from its preset "1" representing electrical state to its "0" electrical state. It will be apparent from this discussion that in the absence of other biases on the gates each positive going excursion of a signal Q1, Q2, Q3, Q4, etc., will be effective in applying a positive going signal to the base of the conducting transistor Q11 of the connected flip flop and as a consequence will be effective in switching this flip flop to its "0" representing electrical state. On the other hand, assuming that the output of amplifier A1, A2, etc., has gone positive as a result of the presence of a feed hole in an associated information position on the tape this positive voltage on the gate results in charging of the capacitor C11 of the associated position counter flip flop toward ground potential. The excursion of the associated one of the flip flops Q1 through Q5 from its negative voltage state towards ground is therefore ineffective, to apply a positive going signal to the base of the transistor and, hence, cut-off of the conducting transistor is avoided.

Although but one embodiment of this invention has been described herein, it will be appreciated by those skilled in the art that numerous changes in circuit details may be made without departing from the spirit and scope of this invention. In this connection, reference may be made to the fact that various types of switching circuits may be substituted for the relays herein and that gating circuits and flip flops using other than the negative type of signal voltage logic and control as herein described may be employed. Accordingly, it is intended that the foregoing disclosure and the showings made in the drawings shall be considered only as illustrative of the principles of this invention and not construed in a limiting sense.

What is claimed is:
1. An electrical system of control, comprising:
 (a) a movable record member having information rows, a timing track, a start of code marker and an end of block marker;
 (b) a row counter having a reset input circuit and a count input circuit;
 (c) a row counter control circuit responsive to said end of block marker and coupled to said reset input circuit for producing a reset signal holding said row counter in reset condition;
 (d) circuit means responsive to said timing track and coupled to said count input circuit for driving said counter in the absence of a reset signal;
 (e) and circuit means responsive to said start of code marker and coupled to said row counter control circuit for operating said row counter control circuit to remove said reset signal.
2. An electrical system of control, comprising:
 (a) a movable record member having information rows, a timing track, a start-of-code marker and an end-of-block marker;
 (b) a row counter having a reset input circuit and a count input circuit;
 (c) control circuit means having two input circuits and coupled to said reset input circuit to reset said row counter and hold said row counter in reset condition when one of said two input circuits is energized and operable when the other of said two input circuits is energized to remove said reset signal to permit operation of said row counter;
 (d) means responsive to said end-of-block marker and coupled to said one input circuit of said control circuit means to cause said control circuit means to reset said counter;
 (e) circuit means responsive to said timing track and coupled to said input circuit of said row counter for driving said row counter in the absence of a reset signal;
 (f) and means responsive to said start-of-code marker and coupled to said other of said two input circuits of said control means to remove said reset signal.
3. An electrical system of control, comprising:
 (a) a movable record member having information rows, a timing track, a start-of-code marker and an end-of-block marker;
 (b) a row counter having a reset input circuit and a count input circuit;
 (c) means responsive to said timing track and coupled to said count input circuit of said row counter for driving said row counter;
 (d) means responsive to said end-of-block marker and coupled to said reset input circuit of said row counter for resetting said row counter and holding said row counter in reset condition in the presence of signals on said input circuit;
 (e) and means coupling said start signal output cir- and coupled to said reset input circuit of said row counter for removing said reset signal and permitting said row counter to be driven in response to signals on said count input circuit.
4. An electrical system of control, comprising:
 (a) a discrete signal program controller having a start signal output circuit and a timing signal output circuit;
 (b) a counter having a reset input circuit and a count input circuit;
 (c) means coupling said timing signal output circuit to said count input circuit of said counter;
 (d) control means coupled to said reset input circuit of said row counter and applying a reset signal thereto resetting said row counter and inhibiting operation of said row counter in response to signals on said count input circuit;
 (e) and means coupling said start signal output circuit to said control means to operate said control means in the presence of a start signal to remove said reset signal.
5. An electrical system of control, comprising:
 (a) a discrete signal program controller having a start signal output circuit, a timing signal output circuit and a stop signal output circuit;
 (b) a counter having a reset input circuit and a count input circuit;
 (c) means coupling said timing signal output circuit to said count input circuit to apply count input signals to drive said counter;
 (d) bistable control means having a pair of input circuits and having an output circuit coupled to said reset input circuit, said bistable control means being operable in one bistable state to apply a reset and count inhibit signal to said reset input circuit and being operable in the other of its bistable states to remove said reset and count inhibit signal from said reset input circuit;

(d) means coupling said stop signal output circuit to one of said pair of input circuits of said bistable control means to set said bistable control means in said one of said bistable states to reset and inhibit said counter;

(e) and means coupling said start signal output circuit to the other of said pair of input circuits of said bistable control means to set said bistable control means to said other of said bistable states to remove said reset and count inhibit signal.

6. An electrical system of control, comprising:
(a) a discrete signal program controller having a start signal output circuit, a timing signal output circuit and a stop signal output circuit;
(b) a counter having a reset input circuit and a count input circuit;
(c) means coupling said timing signal output circuit to said count input circuit to apply count input signals to drive said counter;
(d) a counter control relay having normally closed contacts coupled to said reset input circuit for applying a reset and count inhibit signal to said counter;
(e) means coupling said start signal output circuit to said counter control relay to operate said relay;
(f) and means coupled to said counter control relay for maintaining said relay operated.

7. An electrical system of control, comprising:
(a) a discrete signal program controller having a start signal output circuit, a timing signal output circuit and a stop signal output circuit;
(b) a counter having a reset input circuit and a count input circuit;
(c) means coupling said timing signal output circuit to said count input circuit to apply count input signals to drive said counter;
(d) a counter control relay having normally closed contacts coupled to said reset input circuit for applying a reset and count inhibit signal to said counter;
(e) means coupling said start signal output circuit to said counter control relay to operate said relay;
(f) holding circuit means coupled to said counter control relay for maintaining said counter control relay operated;
(g) and means coupled to said stop signal output circuit and having an output circuit coupled to said counter control relay for rendering said counter control relay inoperative in the presence of a stop signal.

8. An electrical system of control, comprising:
(a) a discrete signal program controller having a start signal output circuit, a timing signal output circuit and a stop signal output circuit;
(b) a counter having a reset input circuit and a count input circuit;
(c) means coupling said timing signal output circuit to said count input circuit to apply count input signals to drive said counter;
(d) a counter control relay having normally closed contacts coupled to said reset input circuit for applying a reset and count inhibit signal to said counter;
(e) means coupling said start signal output circuit to said counter control relay to operate said relay;
(f) holding circuit means coupled to said counter control relay for maintaining said counter control relay operated;
(g) a program controller relay having contacts coupled to said counter control relay and having contacts coupled to said program controller for rendering said counter control relay inoperative when said program controller relay is inoperative and for rendering said program controller operative when said program controller relay is operated;
(h) and means for controlling said program controller relay.

9. An electrical system of control, comprising:
(a) a discrete signal program controller having a start signal output circuit, a timing signal output circuit and a stop signal output circuit;
(b) a counter having a reset input circuit and a count input circuit;
(c) means coupling said timing signal output circuit to said count input circuit to apply count input signals to drive said counter;
(d) a counter control relay having normally closed contacts coupled to said reset input circuit for applying a reset and count inhibit signal to said counter;
(e) means coupling said start signal output circuit to said counter control relay to operate said relay;
(f) holding circuit means coupled to said counter control relay for maintaining said counter control relay operated;
(g) a program controller relay having contacts coupled to said counter control relay and having contacts coupled to said program controller for rendering said counter control relay inoperative when said program controller relay is inoperative and for rendering said program controller operative when said program controller relay is operated;
(h) a stop relay coupled to and operated by said stop signal output circuit and having contacts coupled to said program controller relay for rendering said program controller relay inoperative when said stop relay is energized;
(i) and means for operating said program controller relay.

10. An electrical system of control, comprising:
(a) a discrete signal program controller having a start signal output circuit, a timing signal output circuit and a stop signal output circuit;
(b) a counter having a reset input circuit and a count input circuit;
(c) means coupling said timing signal output circuit to said count input circuit to apply count input signals to drive said counter;
(d) a counter control relay having normally closed contacts coupled to said reset input circuit for applying a reset and count inhibit signal to said counter;
(e) means coupling said start signal output circuit to said counter control relay to operate said relay;
(f) holding circuit means coupled to said counter control relay for maintaining said counter control relay operated;
(g) a program controller relay having contacts coupled to said counter control relay and having contacts coupled to said program controller for rendering said counter control relay inoperative when said program controller relay is inoperative and for rendering said program controller operative when said program controller relay is operated;
(h) a stop relay coupled to and operated by said stop signal output circuit and having contacts coupled to said program controller relay for rendering said program controller relay inoperative when said stop relay is energized;
(i) and a start switch coupled to said program controller relay in parallel with said contacts of said stop relay.

11. An electrical system of control, comprising:
(a) a discrete signal program controller having a start signal output circuit, a timing signal output circuit, a plurality of information signal output circuits and a stop signal circuit;
(b) a timing signal counter having a count input circuit coupled to timing signal output circuit, having a reset input circuit and having a plurality of output circuits successively representing higher counts, bistable control means having a pair of input circuits coupled to said stop signal output circuit and said start signal output circuits, respectively, and having an output circuit coupled to said reset input circuit of said timing signal counter for applying a resetting and count inhibiting signal to said timing signal counter in the presence of a stop signal and for removing said reset and count inhibiting signal in the presence of a start signal;

(c) a plurality of groups of gating circuits each logically combining a select one of said timing signal counter output circuits with at least one of said plurality of information signal output circuits, each gating circuit of each group having a gate output circuit;

(d) a storage circuit having a plurality of electrical devices operable between two electrical states;

(e) circuit means coupling said respective gate output circuits to respective electrical devices for controlling said electrical devices;

(f) and means coupled to and responsive to said electrical devices.

12. An electrical system of control, comprising:

(a) a discrete signal program controller having a start signal output circuit, a timing signal output circuit, a plurality of information signal output circuits and a stop signal circuit;

(b) a timing signal counter having a count input circuit coupled to timing signal output circuit, having a reset input circuit and having a plurality of output circuits successively representing higher counts, bistable control means having a pair of input circuits coupled to said stop signal output circuit and said start signal output circuits, respectively, and having an output circuit coupled to said reset input circuit of said timing signal counter for applying a resetting and count inhibiting signal to said timing signal counter in the presence of a stop signal and for removing said reset and count inhibiting signal in the presence of a start signal;

(c) a plurality of groups of gating circuits each logically combining a select one of said timing signal counter output circuits with at least one of said plurality of information signal output circuits, each gating circuit of each group having a gate output circuit;

(d) a storage circuit having a plurality of electrical devices operable between two electrical states;

(e) circuit means coupling one of said plurality of output circuits of said timing signal counter to each electrical device to set each electrical device to one of said two electrical states;

(f) circuit means coupling said respective gate output circuits to respective electrical devices for setting said electrical devices to the other of said two electrical states in the presence of gate output signals;

(g) and means coupled to and responsive to said electrical devices.

13. An electrical system of control, comprising:

(a) a discrete signal program controller having a start signal output circuit, a timing signal output circuit, a plurality of information signal output circuits and a stop signal circuit;

(b) a timing signal counter having a count input circuit coupled to timing signal output circuit, having a reset input circuit and having a plurality of output circuits successively representing higher counts, bistable control means having a pair of input circuits coupled to said stop signal output circuit and said start signal output circuits, respectively, and having an output circuit coupled to said reset input circuit of said timing signal counter for applying a resetting and count inhibiting signal to said timing signal counter in the presence of a stop signal and for removing said reset and count inhibiting signal in the presence of a start signal;

(c) a plurality of groups of gating circuits each logically combining a select one of said timing signal counter output circuits with at least one of said plurality of information signal output circuits, each gating circuit of each group having a gate output circuit;

(d) a count down counter having a plurality of electrical devices operable between two electrical states and having a count down input circuit;

(e) circuit means coupling one of said plurality of output circuits of said timing signal counter to each electrical device to set each electrical device to one of said two electrical states;

(f) circuit means coupling said respective gate output circuits to respective electrical devices for setting said electrical devices to the other of said two electrical devices in the presence of gate output signals;

(g) motor means;

(h) means coupled to said electrical devices and to said motor means for controlling said motor means in response to said electrical devices;

(i) a position transducer coupled to and operated by said motor means;

(j) and pulse generating means coupled to and responsive to said transducer and having an output circuit coupled to said count down input circuit of said count down counter.

14. An electrical system of control, comprising:

(a) a discrete signal program controller having a start signal output circuit, a timing signal output circuit, a plurality of information signal output circuits and a stop signal circuit;

(b) a timing signal counter having a count input circuit coupled to timing signal output circuit, having a reset input circuit and having a plurality of output circuits successively representing higher counts, bistable control means having a pair of input circuits coupled to said stop signal output circuit and said start signal output circuits, respectively, and having an output circuit coupled to said reset input circuit of said timing signal counter for applying a resetting ad count inhibiting signal to said timing signal counter in the presence of a stop signal and for removing said reset and count inhibiting signal in the presence of a start signal;

(c) a plurality of groups of gating circuits each logically combining a select one of said timing signal counter output circuits with at least one of said plurality of information signal output circuits, each gating circuit of each group having a gate output circuit;

(d) a count down counter having a plurality of flip-flops interconnected for count down operation and having a count down input circuit, each flip-flop having a "1" setting input circuit, a "0" setting input circuit and an output circuit;

(e) circuit means coupling one of said plurality of output circuits of said timing signal counter to each "1" setting input circuit of said flip-flops;

(f) circuit means coupling said respective gate output circuits to respective "0" setting input circuits of said flip-flops;

(g) motor means;

(h) means coupled to said output circuits of said flip-flops and to said motor means for controlling said motor means in response to said flip-flops;

(i) a position transducer coupled to said motor means and operated thereby;

(j) and pulse generating means coupled to and responsive to said transducer and having an output circuit coupled to said count down input circuit of said count down counter.

(References on following page)

References Cited by the Examiner

UNITED STATES PATENTS

| | | | |
|---|---|---|---|
| 2,680,241 | 6/1954 | Gridley | 340—172.5 X |
| 2,901,734 | 8/1959 | Welsh et al. | 340—174.1 |
| 2,904,777 | 9/1959 | Cox et al. | 340—172.5 |
| 2,923,921 | 2/1960 | Shapin | 340—172.5 |
| 2,941,188 | 6/1960 | Fletchner et al. | 340—174 |
| 2,975,407 | 3/1961 | O'Brien | 340—172.5 |
| 2,996,699 | 8/1961 | Kramskoy | 340—172.5 |
| 3,054,987 | 9/1962 | Lawrence et al. | 340—172.5 |
| 3,054,990 | 9/1962 | Noonan | 340—172.5 X |
| 3,061,192 | 10/1962 | Terzian | 340—172.5 X |

ROBERT C. BAILEY, *Primary Examiner.*

MALCOLM A. MORRISON, *Examiner.*

P. L. BERGER, *Assistant Examiner.*